United States Patent
Ueda et al.

(10) Patent No.: US 9,504,035 B2
(45) Date of Patent: Nov. 22, 2016

(54) COMMUNICATION TERMINAL, CHANNEL SELECTION METHOD, AND PROGRAM

(75) Inventors: Hirofumi Ueda, Tokyo (JP); Norihito Fujita, Tokyo (JP)

(73) Assignee: NEC CORPORATION, Tokyo (JP)

( * ) Notice: Subject to any disclaimer, the term of this patent is extended or adjusted under 35 U.S.C. 154(b) by 291 days.

(21) Appl. No.: 13/989,968

(22) PCT Filed: Dec. 1, 2011

(86) PCT No.: PCT/JP2011/077817
§ 371 (c)(1),
(2), (4) Date: May 28, 2013

(87) PCT Pub. No.: WO2012/074062
PCT Pub. Date: Jun. 7, 2012

(65) Prior Publication Data
US 2013/0242934 A1  Sep. 19, 2013

(30) Foreign Application Priority Data
Dec. 2, 2010 (JP) .................................. 2010-269540

(51) Int. Cl.
*H04W 72/04* (2009.01)
*H04W 72/02* (2009.01)
(Continued)

(52) U.S. Cl.
CPC ........ *H04W 72/0453* (2013.01); *H04L 45/125* (2013.01); *H04W 40/04* (2013.01);
(Continued)

(58) Field of Classification Search
CPC ............... H04W 72/042; H04W 24/10; H04W 72/0413; H04W 72/0453; H04L 5/0048
See application file for complete search history.

(56) References Cited

U.S. PATENT DOCUMENTS

2003/0210680 A1*  11/2003  Rao et al. ...................... 370/352
2007/0223439 A1*  9/2007  Kosai ............................. 370/338
(Continued)

FOREIGN PATENT DOCUMENTS

CN      1650583 A      8/2005
JP   2008-278450 A    11/2008
(Continued)

OTHER PUBLICATIONS

Li Li et al., "Efficient Broadcasting in Multi-radio Multi-channel and Multi-hop Wireless Networks Based on Self-pruning", High Performance Computing and Communications Lecture Notes in Computer Science, 2007, vol. 4782/2007, pp. 484-495.
(Continued)

*Primary Examiner* — Charles C Jiang
*Assistant Examiner* — Thad Defauw

(57) ABSTRACT

A communication terminal, comprises: a wireless communication unit to which a plurality of channels are allocated; a channel status calculation unit that calculates, when one of the plurality of channels is set as a forwarding channel, a capacity that can be used in the one channel by the communication terminal and a capacity that can be used in the one channel by another communication terminal; and a channel selection unit that determines, when one of the plurality of channels is set as a forwarding channel, whether a capacity that can be used in the one channel by the communication terminal satisfies a required bandwidth and determines, when another communication terminal has set the one channel as a forwarding channel, whether a capacity that can be used in the one channel by the another communication terminal satisfies the required bandwidth.

11 Claims, 13 Drawing Sheets

(51) Int. Cl.
*H04L 12/729* (2013.01)
*H04W 40/04* (2009.01)
*H04W 88/04* (2009.01)

(52) U.S. Cl.
CPC ......... *H04W 72/02* (2013.01); *H04W 72/0486* (2013.01); *H04W 88/04* (2013.01)

(56) References Cited

U.S. PATENT DOCUMENTS

| | | | |
|---|---|---|---|
| 2008/0240049 A1* | 10/2008 | Gaur | 370/338 |
| 2009/0052327 A1 | 2/2009 | Larsson et al. | |
| 2009/0109868 A1* | 4/2009 | Chen et al. | 370/254 |
| 2010/0216486 A1* | 8/2010 | Kwon et al. | 455/452.2 |

FOREIGN PATENT DOCUMENTS

| | | | |
|---|---|---|---|
| JP | 2008278450 A | 11/2008 |
| JP | 2009-500901 A | 1/2009 |
| TW | 200704028 A | 1/2007 |

OTHER PUBLICATIONS

Kai Han et al., "Reducing Multicast Redundancy and Latency in Multi-Interface Multi-Channel Wireless Mesh Networks", I.J. Information Engineering and Electronic Business, 2009, 1, pp. 45-50, Published online Oct. 2009 in MECS <http://www.mecs-press.org/>.

International Search Report of PCT Application No. PCT/JP2011/077817 mailed on Feb. 21, 2012.

Chinese Office Action; Application No. 201180057921.6; Jul. 7, 2015.

* cited by examiner

FIG. 4

CHANNEL STATUS TABLE D102

| USE OF CHANNEL CH1 | | USE OF CHANNEL CH2 | |
|---|---|---|---|
| TERMINAL ID | AVAILABLE CAPACITY | TERMINAL ID | AVAILABLE CAPACITY |
| OWN TERMINAL | *CH1= 10 | OWN TERMINAL | *CH2= 10 |
| Node 1 | CH1=15, *CH2=20 | Node 1 | CH1=15, *CH2=20 |
| Node 2 | *CH1=7.5, CH2=20 | Node 2 | *CH1=15, CH2= 10 |
| Node 3 | CH1=7.5, CH3=20 | Node 3 | CH1=7.5, CH3=7 |
| .. | .. | .. | .. |
| USE OF CHANNEL CH3 | | USE OF CHANNEL CH4 | |
| TERMINAL ID | AVAILABLE CAPACITY | TERMINAL ID | AVAILABLE CAPACITY |
| .. | .. | .. | .. |

FIG. 5

| MATCHING CHANNEL INFORMATION D103 |
|---|
| MATCHING CHANNEL ID |
| CH2 |
| CH4 |
| .. |

COMMUNICATION TERMINAL, CHANNEL SELECTION METHOD, AND PROGRAM

REFERENCE TO RELATED APPLICATION

The present application is a National Stage Entry of PCT/JP2011/077817 filed Dec. 1, 2011, which is based on and claims the benefit of the priority of Japanese Patent Application No. 2010-269540, filed on Dec. 2, 2010, the disclosures of all of which are incorporated herein in their entirety by reference.

FIELD

The present invention relates to a communication terminal, a channel selection method, and a program. In particular, it relates to a communication terminal, a channel selection method, and a program for selecting a channel that can be used for data forwarding via wireless communication.

BACKGROUND

In recent years, a communication terminal including a plurality of wireless interfaces has been attracting attention. This communication terminal executes communication by selecting a channel and a communication method to be used from among various frequencies (channels) and communication methods. In addition, a multi-channel/multi-interface (MCH/IF) environment has also been attracting attention as a network including such communication terminal.

In an MCH/IF environment, a communication terminal determines a channel used by each of the wireless interfaces provided with the communication terminal from among many available channels. In this operation, a network topology in which a plurality of channels are multiplexed is established.

There are possible ways to multiplex wireless interfaces and channels. For example, when a single wireless interface executes communication, by quickly switching to a suitable channel, it is possible to make it look as if the communication terminal is simultaneously using a plurality of channels. In another possible way, by allocating one type of channel to a single wireless interface and by providing a plurality of such wireless interfaces, different channels are simultaneously used.

In either way, the same network topology is generated as a result. The following description will be made based on an environment where one type of channel is allocated to a single wireless interface as an example. In addition, selection of a wireless interface executing re-forwarding and selection of a forwarding channel will be deemed as being identical.

Communication links constituting a topology in an MCH/IF environment have different characteristics, depending on the frequency levels used by the wireless interfaces. For example, in the low-frequency VHF (Very High Frequency) or UHF (Ultra High Frequency) bandwidth, while long-distance communication is possible, the communication bandwidth (capacity) is limited to several hundred kbps. In contrast, in the high-frequency SHF (Super High Frequency) bandwidth of 3 GHz or more, while a bandwidth of a few M to several hundred Mbps can be obtained, the communication distance is limited to approximately several hundred meters to several dozen meters.

A communication terminal uses a plurality of wireless interfaces, and a different channel is allocated to each of the wireless interfaces. Thus, the communication terminal recognizes a different number of neighboring terminals and has a different capacity per wireless interface/channel. In addition, a plurality of communication links including different communication characteristics (capacities, communication ranges) with respect to each communication terminal can exist.

In a network topology in such MCH/IF environment, in order to execute path control and to control an application in the same way as before, a broadcast distribution technique for enabling data transmission to all the communication terminals on a network or to communication terminals within a certain range is needed.

For example, Non Patent Literatures NPL1 and NPL2 disclose a method for selecting an optimum forwarding channel from among the channels that can currently be used by wireless interfaces provided with a communication terminal when a network topology in an MCH/IF environment is previously given.

[NPL1]
Li Li, Bin Qin, Chunyuan Zhang and Haiyan Li, "Efficient Broadcasting in Multi-radio Multi-channel and Multi-hop Wireless Networks Based on Self-pruning," High Performance Computing and Communications Lecture Notes in Computer Science, 2007, Vol. 4782/2007, p. 484-495.

[NPL2]
Kai Han and Yang Liu, "Reducing Multicast Redundancy and Latency in Multi-Interface Multi-Channel Wireless Mesh Networks," I.J. Information Engineering and Electronic Business, 2009, 1, p. 42-50 Published Online October 2009 in MECS.

SUMMARY

The entire disclosures of the above Non Patent Literatures NPL1 and NPL2 are incorporated herein by reference thereto. The following analysis has been made by the present inventor.

According to the techniques disclosed in Non Patent Literatures NPL1 and NPL2, an existing algorithm for selecting a re-forwarding terminal (re-forwarding interface) in a conventional network, namely, in an environment where one type of channel shared by communication terminals is used for communication can be applied to an MCH/IF environment.

Thus, as in conventional techniques, Non Patent Literatures NPL1 and NPL2 adopt an algorithm for selecting a broadcast distribution path so that more neighboring communication terminals connected to a wireless interface are included. Namely, without regard for communication characteristics of the channels that can be used by a communication terminal, a channel that enables communication with many communication terminals at a time is selected as a forwarding channel, and a broadcast distribution path is selected so that the minimum number of data re-forwarding operations is achieved.

However, as described above, an MCH/IF environment includes wireless interfaces to which channels having different communication characteristics are allocated. In view of the above channel characteristics, it is conceivable that "a channel that enables communication with many communication terminals at a time" selected as a forwarding channel in Non Patent Literatures NPL1 and NPL2 is a low frequency channel that enables communication over a wide range. Thus, according to the method disclosed in Non Patent Literatures NPL1 and NPL2, a channel having a small capacity is selected as a forwarding channel, counted as a problem.

In addition, a channel is a resource shared by communication terminals. Thus, if the same channel is selected many times, channel sharing, interference, etc. among communication terminals are caused. In addition, as the number of communication terminals simultaneously using a frequency increases, the available capacity is further limited.

For example, to solve the above problem, if a required bandwidth is set, a certain communication terminal first selects a channel having a sufficient capacity as a forwarding channel, and other communication terminals next select the same channel as that selected by the certain communication terminal as a forwarding channel, the channel is shared by these communication terminals. In this case, the capacity of the certain communication terminal that first selects the forwarding channel is decreased from the time when the certain communication terminal first selects the forwarding channel, and as a result, the required bandwidth cannot be satisfied.

In contrast, there are cases where another communication terminal first selects a forwarding channel. In such cases, since a channel that can be used by the certain terminal and the forwarding channel first selected by the communication terminal compete against each other, when subsequently selecting and determining a forwarding channel, the communication terminal cannot select a channel achieving a capacity sufficient to satisfy a required bandwidth.

Thus, to establish a stable broadcast distribution path in an MCH/IF environment, it is necessary to select a channel that can be used for selecting a forwarding channel, before a forwarding channel is selected by a broadcast distribution algorithm.

According to the above techniques, a communication terminal cannot select, from among the channels that can be used by the communication terminal, a channel so that both the capacities of the forwarding channels previously set by the other communication terminals and the capacity of a forwarding channel of the communication terminal satisfy a required bandwidth. This is because the communication terminal does not consider the capacities of the channels actually available when selecting a forwarding channel and the decrease amounts of the capacities of the forwarding channels of the neighboring communication terminals.

In addition, according to the above techniques, because of channel interference or sharing caused when a certain communication terminal first sets a forwarding channel, other communication terminals that have not set a forwarding channel yet cannot select a channel satisfying a required bandwidth from among available channels. This is because the above techniques do not consider the fact that setting of a forwarding channel by a certain communication terminal decreases the capacities of the channels that can be used by other communication terminals that have not set a forwarding channel yet.

Accordingly, there is a need in the art to create a data forwarding path satisfying a required bandwidth among a plurality of communication terminals in a multi-channel/multi-interface (MCH/IF) environment.

According to a first aspect of the present invention, there is provided a communication terminal, comprising:
a wireless communication unit to which a plurality of channels are allocated;
a channel status calculation unit that calculates, when one of the plurality of channels is set as a forwarding channel, a capacity that can be used in the one channel by the communication terminal and a capacity that can be used in the one channel by another communication terminal; and
a channel selection unit that determines, when one of the plurality of channels is set as a forwarding channel, whether a capacity that can be used in the one channel by the communication terminal satisfies a required bandwidth and determines, when another communication terminal has set the one channel as a forwarding channel, whether a capacity that can be used in the one channel by the another communication terminal satisfies the required bandwidth.

According to a second aspect of the present invention, there is provided a channel selection method, comprising:
by a communication terminal including a wireless communication unit to which a plurality of channels are allocated,
calculating, when one of the plurality of channels is set as a forwarding channel, a capacity that can be used in the one channel by the communication terminal and a capacity that can be used in the one channel by another communication terminal; and
determining, when one of the plurality of channels is set as a forwarding channel, whether a capacity that can be used in the one channel by the communication terminal satisfies a required bandwidth, and determining, when another communication terminal has set the one channel as a forwarding channel, whether a capacity that can be used in the one channel by the another communication terminal satisfies the required bandwidth.

According to a third aspect of the present invention, there is provided a program, causing a computer of a communication terminal including a wireless communication unit to execute:
calculating, when one of a plurality of channels allocated to the wireless communication unit is set as a forwarding channel, a capacity that can be used in the one channel by the communication terminal and a capacity that can be used in the one channel by another communication terminal; and
determining, when one of the plurality of channels is set as a forwarding channel, whether a capacity that can be used in the one channel by the communication terminal satisfies a required bandwidth, and determining, when another communication terminal has set the one channel as a forwarding channel, whether a capacity that can be used in the one channel by the another communication terminal satisfies the required bandwidth.

The program can be provided as a program product recorded in a non-transient computer-readable recording medium.

The present invention provides the following advantage, but not restricted thereto. Based on the communication terminal, the channel selection method, and the program according to the present invention, it is possible to create a data forwarding path satisfying a required bandwidth among a plurality of communication terminals in a multi-channel/multi-interface (MCH/IF) environment.

BRIEF DESCRIPTION OF DRAWINGS

FIG. 4 illustrates a channel status table.

FIG. 5 illustrates matching channel information.

PREFERRED MODES

Figure 1:
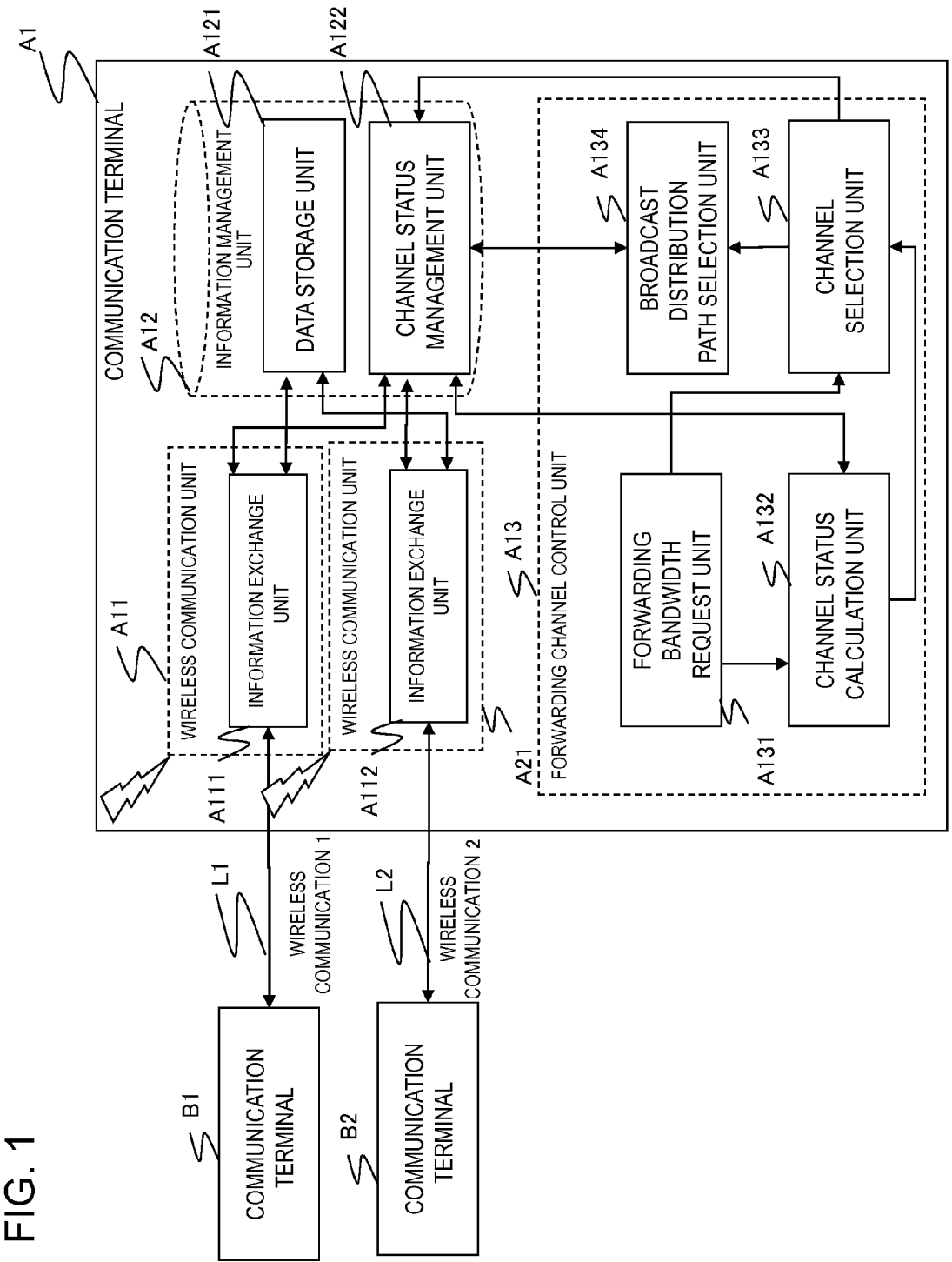
FIG. 1 is a block diagram illustrating a configuration of a communication terminal according to a first exemplary embodiment.

In the present disclosure, there are various possible modes, which include the following, but not restricted thereto. First, an outline of the present invention will be described. However, the reference characters in the following outline are merely used as examples to facilitate understanding of the present invention. Therefore, the reference characters are not intended to limit the present invention to the illustrated modes.

With reference to FIG. 1, a communication terminal (A1) includes a wireless communication unit (A11) to which a plurality of channels are allocated; a channel status calculation unit (A132) that calculates, when one of the plurality of channels is set as a forwarding channel, a capacity that can be used in the one channel by the communication terminal (A1) and a capacity that can be used in the one channel by another communication terminal; and a channel selection unit (A133) that determines, when one of the plurality of channels is set as a forwarding channel, whether a capacity that can be used in the one channel by the communication terminal (A1) satisfies a required bandwidth and determines, when another communication terminal has set the one channel as a forwarding channel, whether a capacity that can be used in the one channel by the another communication terminal satisfies the required bandwidth.

The communication terminal (A1) can select, from among the plurality of channels allocated to the wireless communication unit (A11), a channel so that the capacities of forwarding channels of the communication terminal (A1) and the another communication terminal that has already set a forwarding channel satisfy a required bandwidth. This is because, with the communication terminal (A1), the channel status calculation unit (A132) can calculate the capacity of each channel set as a forwarding channel by the communication terminal (A1) and the capacity of each channel already set as a forwarding channel by the another communication terminal and the channel selection unit (A133) can select a channel so that these capacities satisfy a required bandwidth.

The channel selection unit (A133) may determine whether a capacity of at least one channel allocated to another communication terminal that has not set a forwarding channel yet satisfies a required bandwidth.

The communication terminal (A1) can select, from among the plurality of channels allocated to the wireless communication unit (A11), a channel so that the capacities of forwarding channels of the communication terminal (A1) and the another communication terminal that has not set a forwarding channel yet satisfy a required bandwidth. This is because, with the communication terminal (A1), the channel status calculation unit (A132) can calculate the capacity of a channel set as a forwarding channel by the communication terminal (A1) and the channel selection unit (A133) can select a channel so that the capacity of a channel set as a forwarding channel by the communication terminal (A1) satisfies a required bandwidth and the capacity of a channel set as a forwarding channel among the channels allocated to the another terminal that has not set a forwarding channel yet satisfies the required bandwidth.

According to the present invention, the following modes are possible.

[Mode 1]

A communication terminal may be the communication terminal according to the above first aspect.

[Mode 2]

The channel selection unit may determine whether a capacity of at least one channel among the plurality of channels, which is allocated to another communication terminal that has not set a forwarding channel yet, satisfies the required bandwidth.

[Mode 3]

The communication terminal may further comprise a channel status table that stores a channel allocated to a wireless communication unit of another communication terminal and an identifier indicating whether the another communication terminal has already set the channel as a forwarding channel.

[Mode 4]

When one of the plurality of channels is set as a forwarding channel, the channel status calculation unit may calculate a capacity that can be used in the one channel by the communication terminal and a capacity that can be used in the one channel by another communication terminal, based on a maximum capacity that can be used in the one channel and a number of other communication terminals that have set the one channel as a forwarding channel.

[Mode 5]

The another communication terminal may be a communication terminal that is affected by channel interference when one of the plurality of channels is used.

[Mode 6]

A communication terminal may comprise:

a wireless interface to which a communication channel is allocated;

a channel status calculation unit that, using information about a channel available to another neighboring communication terminal and information about presence or absence of a forwarding channel setting with respect to the available channel, calculates, when a channel available to the communication terminal is set as a forwarding channel, a capacity that can be obtained by the communication terminal and amount of decrease in a capacity of a channel available to the another neighboring communication terminal; and a channel selection unit that determines, based on a calculation result obtained from the channel status calculation unit, whether the capacity that can be obtained by the communication terminal satisfies a required bandwidth and whether a capacity of a forwarding channel that has already been set by the another neighboring communication terminals satisfies the required bandwidth.

[Mode 7]

A communication terminal may comprise:

a wireless interface to which a communication channel is allocated;

a channel status calculation unit that, using information about a channel available to another neighboring communication terminal and information about presence or absence of a forwarding channel setting with respect to the available channel, calculates, when a channel available to the communication terminal is set as a forwarding channel, a capacity that can be obtained by the communication terminal and amount of decrease in a capacity of the channel available to the another neighboring communication terminal; and a channel selection unit that determines, based on a calculation result obtained from the channel status calculation unit, whether the capacity that can be obtained by the communication terminal satisfies a required bandwidth and whether at least one channel available to the another neighboring communication terminal that has not selected a forwarding channel yet satisfies the required bandwidth.

[Mode 8]

A communication terminal may comprise:

a wireless interface to which a communication channel is allocated;

a channel status calculation unit that, using information about a channel available to another neighboring communication terminal and information about presence or absence of a forwarding channel setting with respect to the available channel, calculates, when a channel available to the communication terminal is set as a forwarding channel, a capacity that can be obtained by the communication terminal and amount of decrease in a capacity of the channel available to the another neighboring communication terminal; and a channel selection unit that determines, based on a calculation result obtained from the channel status calculation unit, whether the capacity that can be obtained by the communication terminal satisfies a required bandwidth, whether a capacity of a forwarding channel that has already been set by the another neighboring communication terminal satisfies the required bandwidth, and whether at least one channel available to the another neighboring communication terminal that has not selected a forwarding channel yet satisfies the required bandwidth.

[Mode 9]

The another neighboring communication terminal may be a communication terminal that is affected by channel interference when the communication terminal uses a channel available to the communication terminal.

[Mode 10]

The channel status calculation unit may calculate the amount of decrease in the capacity, based on a maximum capacity that can be used in a channel and a number of other neighboring communication terminals that have set the channel as a forwarding channel.

[Mode 11]

A channel selection method may be the channel selection method according to the above second aspect.

[Mode 12]

The channel selection method may further comprise, by the communication terminal, determining whether a capacity of at least one channel among the plurality of channels, which is allocated to another communication terminal that has not set a forwarding channel yet, satisfies the required bandwidth.

[Mode 13]

The channel selection method may further comprise: by the communication terminal, referring to a channel status table that stores a channel allocated to a wireless communication unit of another communication terminal and an identifier indicating whether the another communication terminal has already set the channel as a forwarding channel.

[Mode 14]

The channel selection method may further comprise, by the communication terminal, calculating, when one of the plurality of channels is set as a forwarding channel, a capacity that can be used in the one channel by the communication terminal and a capacity that can be used in the one channel by another communication terminal, based on a maximum capacity that can be used in the one channel and a number of other communication terminals that have set the one channel as a forwarding channel.

[Mode 15]

The another communication terminal may be a communication terminal that is affected by channel interference when one of the plurality of channels is used.

[Mode 16]

A channel selection method may comprise:

by a communication terminal including a wireless interface to which a communication channel is allocated, using information about a channel available to another neighboring communication terminal and information about presence or absence of a forwarding channel setting with respect to the available channel, calculating, when a channel available to the communication terminal is set as a forwarding channel, a capacity that can be obtained by the communication terminal and amount of decrease in a capacity of a channel available to the another neighboring communication terminal; and determining whether the capacity that can be obtained by the communication terminal satisfies a required bandwidth and whether a capacity of a forwarding channel that has already been set by the another neighboring communication terminal satisfies the required bandwidth, and selecting a channel that can be used for data forwarding.

[Mode 17]

A channel selection method may comprise:

by a communication terminal including a wireless interface to which a communication channel is allocated, using information about a channel available to another neighboring communication terminal and information about presence or absence of a forwarding channel setting with respect to the available channel, calculating, when a channel available to the communication terminal is set as a forwarding channel, a capacity that can be obtained by the communication terminal and amount of decrease in a capacity of the channel available to the another neighboring communication terminal; and determining whether the capacity that can be obtained by the communication terminal satisfies a required bandwidth and whether at least one channel available to the another neighboring communication terminal that has not selected a forwarding channel yet satisfies the required bandwidth, and selecting a channel that can be used for data forwarding.

[Mode 18]

A channel selection method comprise:

by a communication terminal including a wireless interface to which a communication channel is allocated, using information about a channel available to another neighboring communication terminal and information about presence or absence of a forwarding channel setting with respect to the available channel, calculating, when a channel available to the communication terminal is set as a forwarding channel, a capacity that can be obtained by the communication terminal and amount of decrease in a capacity of the channel available to the another neighboring communication terminal; and determining whether the capacity that can be obtained by the communication terminal satisfies a required bandwidth, whether a capacity of a forwarding channel that has already been set by the another neighboring communication terminal satisfies the required bandwidth, and whether at least one channel that can be used by the another neighboring communication terminal that has not selected a forwarding channel yet satisfies the required bandwidth, and selecting a channel that can be used for data forwarding.

[Mode 19]

The another neighboring communication terminal may be a communication terminal that is affected by channel interference when the communication terminal uses a channel available to the communication terminal.

[Mode 20]

The channel selection method may comprise calculating the amount of decrease in the capacity, based on a maximum capacity that can be used in a channel and a number of other neighboring communication terminals that have set the channel as a forwarding channel.

[Mode 21]

A program may be the program according to the above third aspect.

[Mode 22]

The program according may further cause the computer to execute determining whether a capacity of at least one channel among the plurality of channels, which is allocated to another communication terminal that has not set a forwarding channel yet, satisfies the required bandwidth.

[Mode 23]

The program may further cause the computer to execute referring to a channel status table that stores a channel allocated to a wireless communication unit of another communication terminal and an identifier indicating whether the another communication terminal has already set the channel as a forwarding channel.

[Mode 24]

The program may further cause the computer to execute calculating, when one of the plurality of channels is set as a forwarding channel, a capacity that can be used in the one channel by the communication terminal and a capacity that can be used in the one channel by another communication terminal, based on a maximum capacity that can be used in the one channel and a number of other communication terminals that have set the one channel as a forwarding channel.

First Exemplary Embodiment

Next, a communication terminal according to a first exemplary embodiment will be described in detail with reference to the drawings.

FIG. 1 is a block diagram illustrating a configuration of a communication terminal A1 according to the present exemplary embodiment. With reference to FIG. 1, the communication terminal A1 includes a plurality of wireless communication units A11 and A21 that execute wireless communication with other communication terminals B1 and B2, an information management unit A12 that manages information stored in the communication terminal, and a forwarding channel control unit A13 that controls a channel for re-forwarding received data. While two other communication terminals are illustrated in FIG. 1 as an example, the number of other communication terminals is not limited to such example. In addition, while two wireless communication units are illustrated, the number of wireless communication units is not limited to such example, either.

The wireless communication units A11 and A21 include information exchange units A111 and A112, respectively.

The information management unit A12 includes a data storage unit A121 and a channel status management unit A122. The forwarding channel control unit A13 includes a forwarding bandwidth request unit A131, a channel status calculation unit A132, a channel selection unit A133, and a broadcast distribution path selection unit A134.

Figure 2:
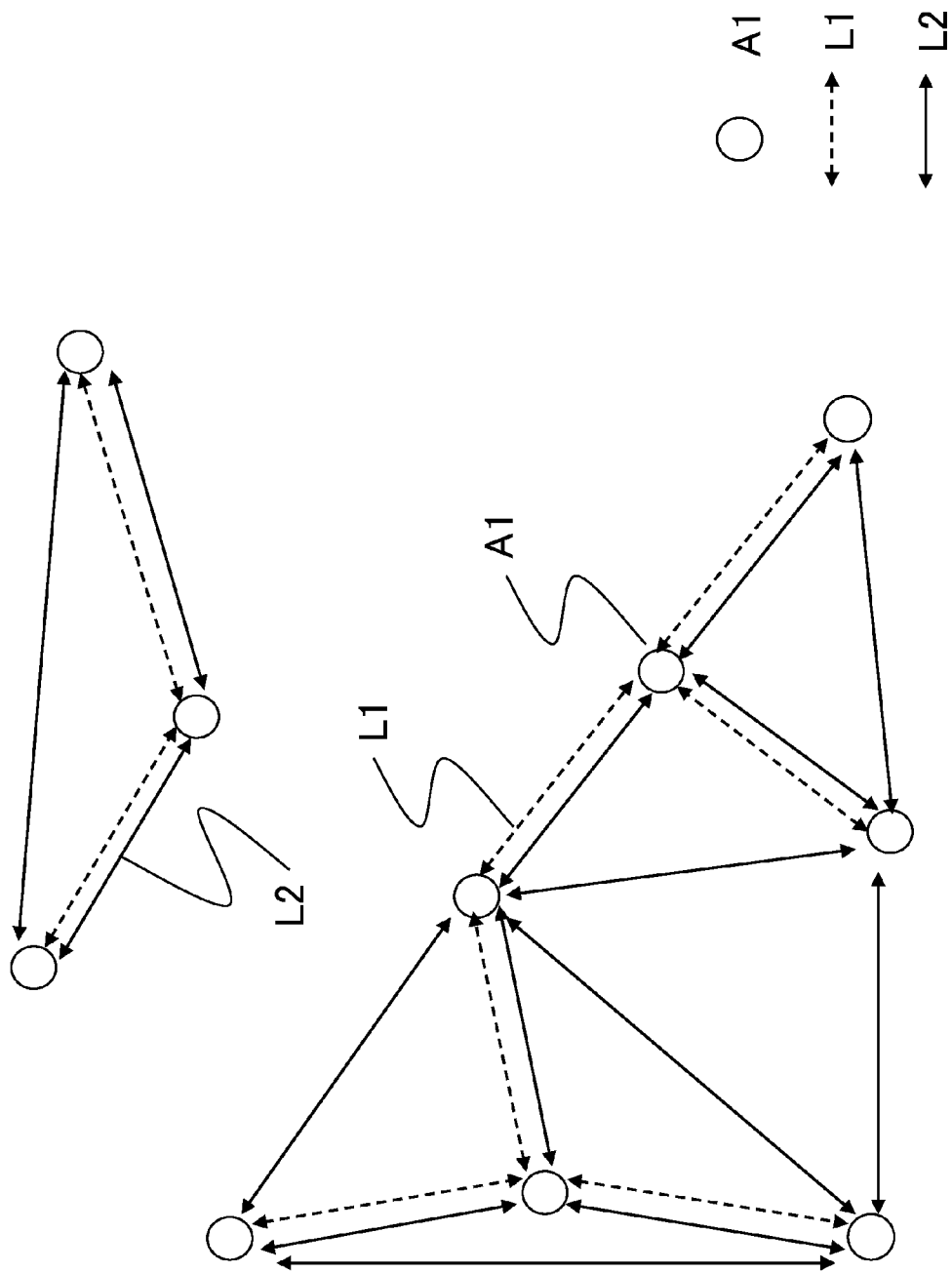
FIG. 2 illustrates a network configuration.

FIG. 2 illustrates a network configuration. With reference to FIG. 2, a plurality of communication terminals A1 are arranged and are connected to each other by wireless communication L1 and L2 executed by the wireless communication units A11 and A21, respectively. Namely, communication is realized by establishing an ad hoc network.

The information exchange units A111 and A112 determine a channel and a communication method used for wireless communication and start wireless communication with the respective communication terminals B1 and B2. In addition, the information exchange units A111 and A112 register setting information about channels used for communication (channel allocation statuses and usage statuses indicating available capacities) in the channel status management unit A122. In addition, the information exchange units A111 and A112 transmit and receive channel setting information (channel allocation information and channel usage statuses) about the communication terminal A1, forwarding channel setting information, neighboring terminal information, information about destination terminals covered by a forwarding channel, content information, these items of information about the other communication terminals B1 and B2 stored in the communication terminal A1 via the wireless communication units A11 and A21. The information exchange units A111 and A112 store the received neighboring terminal information and content information in the data storage unit A121 of the information management unit A12 and store the channel setting information and the forwarding channel setting information in the channel status management unit A122.

The data storage unit A121 stores, updates, and deletes the neighboring terminal information, the destination terminal information, the content information created by the communication terminal A1, and the information acquired via the information exchange units A111 and A112 and transmits requested information to the information exchange unit A111 or to the channel selection unit A133.

The channel status management unit A122 stores, updates, and deletes the channel allocation information and usage statuses about the communication terminal A1 and the other communication terminals, the forwarding channel setting information, and matching channel information transmitted from the channel selection unit A133. In addition, when the information is updated or when the channel status management unit A122 receives an acquisition request, the channel status management unit A122 transmits these items of information via the information exchange units A111 and A112 and collects updated information from the other communication terminals. In addition, when receiving a request for acquiring channel information from the channel status calculation unit A132, the channel status management unit A122 reads and transmits corresponding information to the channel status calculation unit A132 or acquires updated information about communication terminals via the information exchange unit A111 and transmits the information to the channel status calculation unit A132.

The forwarding bandwidth request unit A131 starts calculating channel statuses of neighboring communication terminals and selecting channels that can be used as forwarding channels. If the forwarding bandwidth request unit A131 receives notification of start of selection of forwarding channels and a required bandwidth D100 from the information exchange unit A111, an application, or a protocol executing path control or regularly, the forwarding bandwidth request unit A131 transmits notification of start of calculation of channel statuses of the communication terminal A1 and the other communication terminals to the channel status calculation unit A132 and starts selection of forwarding channels. In addition, the forwarding bandwidth request unit A131 notifies the channel selection unit A133 of information about the required bandwidth D100.

The channel status calculation unit A132 calculates a capacity obtained when the terminal A1 uses an available channel as a forwarding channel and the amount of decrease in the capacity of each of neighboring communication terminals at that time. When the channel status calculation unit A132 receives the notification of start of calculation of channel statuses from the forwarding bandwidth request unit A131, first, the channel status calculation unit A132 transmits a notification for requesting acquisition of the channel allocation information and channel usage statuses about the terminal A1 and the neighboring communication terminals and the forwarding channel setting information about the neighboring communication terminals to the channel status management unit A122 and receives the channel setting information D101 in which the information is described from the channel status management unit A122.

Next, the channel status calculation unit A132 grasps channels that can currently be used by the terminal A1 from the acquired channel setting information D101 and calculates a capacity obtained by the terminal A1 when each of the channels is used and the amount of decrease in a capacity that can be used in each of the forwarding channels of the neighboring communication terminals. The channel status calculation unit A132 executes the calculation for each channel that can be used by the terminal A1.

Figure 3:
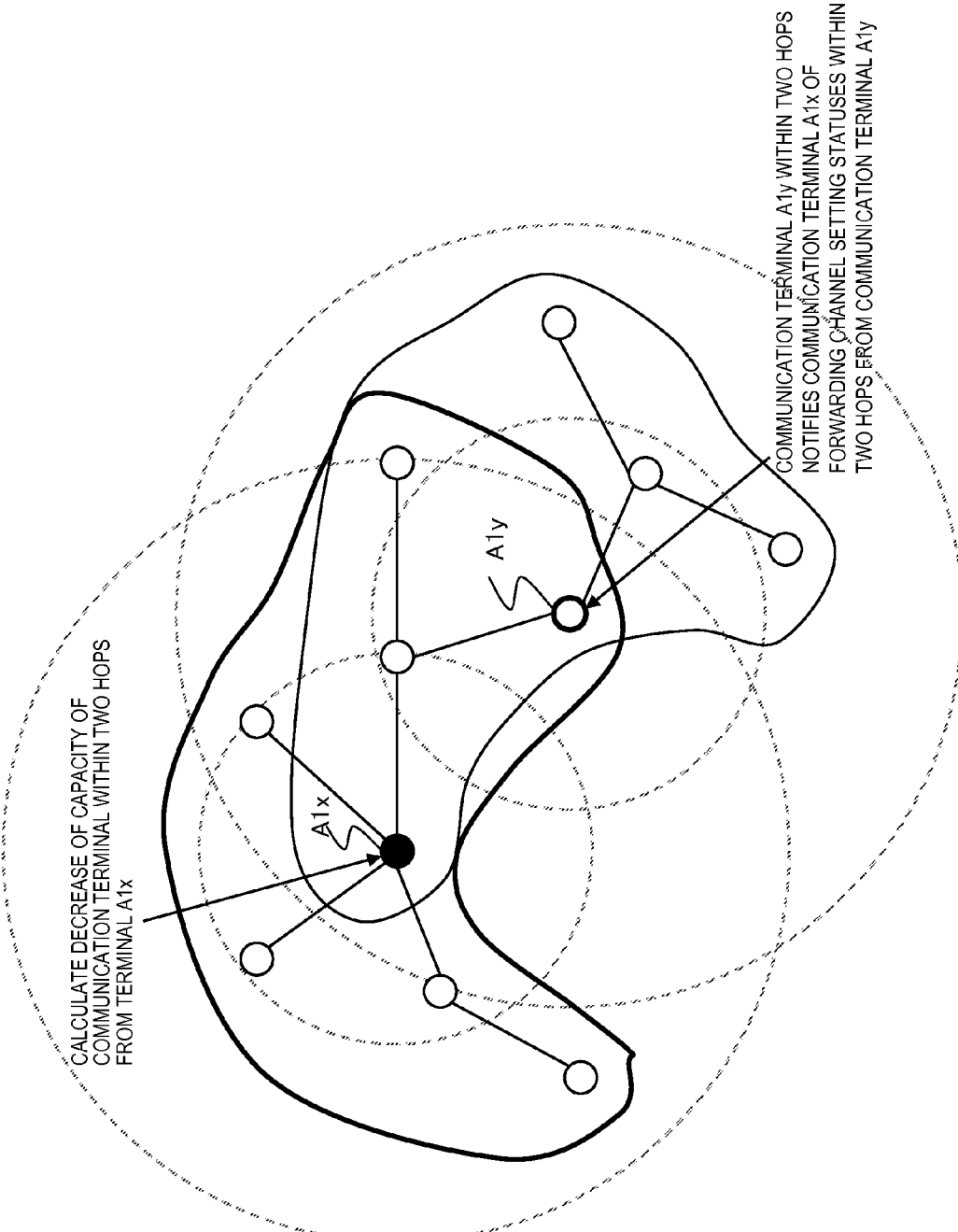
FIG. 3 illustrates a channel capacity calculation range.

FIG. 3 illustrates a channel capacity calculation range. A calculation method will be described with reference to FIG. 3.

First, based on the information acquired from the channel status management unit A122, the channel status calculation unit A132 selects one channel from among the channels available by the terminal A1 (this channel will be referred to as "selected channel"). Next, as illustrated in FIG. 3, the channel status calculation unit A132 calculates capacities of the communication terminals connected to the terminal A1 (a communication terminal A1$x$ in FIG. 3) within an interference range (two hops) via the same channel as the selected channel. More specifically, the channel status calculation unit A132 calculates a capacity that can be used by each terminal in the same channel as the selected channel when the terminal A1$x$ uses the selected channel and the capacities that can be used in the channels other than the selected channel.

Next, the channel status calculation unit A132 refers to the channel allocation information and forwarding channel setting information about the communication terminals within the interference range acquired from the channel status management unit A122. Based on a maximum channel capacity and the number of communication terminals using the same channel as the forwarding channel within the interference range, the channel status calculation unit A132 can calculate the available capacities.

For example, when a broadcast distribution slot is shared by using dynamic TDMA (Time Division Multiple Access), the channel status calculation unit A132 can calculate the capacities based on the following formulas (1) to (3). In contrast, when CSMA (Carrier Sense Multiple Access) is used, the channel status calculation unit A132 can calculate the available capacities by subtracting capacities currently used by other communication terminals within the interference range from a maximum capacity, instead of the number of communication terminals using the same channel as the forwarding channel.

The capacity of each of the communication terminals obtained in the same channel as the selected channel is given by the following formulas (1) and (2).

$$C\_own=C\_max/(N\_use+1) \quad (1)$$

$$C\_other=C\_max/(N\_use+2) \quad (2)$$

The capacity of each of the communication terminals obtained in the channels other than the selected channel is given by the following formula (3).

$$C\_other=C\_max/(N\_use+1) \quad (3)$$

In the above formulas (1) to (3), C_own represents a capacity obtained by the terminal A1, C_other represents a capacity obtained by other communication terminals, C_max represents a maximum channel bandwidth, and N_use represents the number of communication terminals using the same channel as the forwarding channel within the interference range from the terminal A1.

In the present exemplary embodiment, the channel status calculation unit A132 calculates the channel capacities, based on the information previously exchanged with the neighboring communication terminals. When calculating the channel capacities, the channel status calculation unit A132 may transmit requests to the communication terminals within the interference range to acquire the channel allocation statuses and the number of terminals that have already set a forwarding channel. In this case, when receiving such acquisition request, a communication terminal A1$y$ acquires channel information set as forwarding channels in communication terminals within the interference range from the communication terminal A1$y$ and transmits the acquired information to the communication terminal A1$x$ as a reply.

After calculating the capacity of the communication terminal A1$x$ obtained when the selected channel is used and the capacities of the channels that can be used by the other communication terminals, the channel status calculation unit A132 attaches a forwarding channel identifier ("*" in the figure) to the channel selected as the forwarding channel. The channel status calculation unit A132 calculates capacities in the above way for the other channels that can be used by the communication terminal A1$x$.

FIG. 4 illustrates a channel status table D102. After finishing the calculation for all the channels that can be used by the communication terminals, the channel status calculation unit A132 generates the channel status table D102 in FIG. 4 in which the calculation results of the channels are summarized and outputs the channel status table D102 to the channel selection unit A133.

In the present exemplary embodiment, the channel status table D102 includes capacity information about all the channels that can be used by neighboring terminals. Alternatively, the channel status calculation unit A132 may calculate the capacities by using only the information about the channel set as the forwarding channel. By describing only the information about this channel, the channel status calculation unit A132 may generate the channel status table D102 having a reduced data size.

The channel selection unit A133 uses the channel status table D102, selects channels that can be used as forwarding channels from among the channels that can be used by the communication terminal A1, and stores the selected channels in the channel status management unit A122. In addition, the channel selection unit A133 transmits notification of start of selection of a forwarding channel to the broadcast distribution path selection unit A134.

FIG. 5 illustrates matching channel information D103. The channel selection unit A133 refers to the channel status table D102 and selects, from among the channels that can be used by the communication terminal A1 and that are denoted by the forwarding channel identifier, a channel in which the capacity is a required bandwidth or more as a channel that can be used as a forwarding channel. The channel selection unit A133 generates the matching channel information D103 in which the channels that can be used as forwarding channels are described.

An example where the required bandwidth is 10 will be described. According to the channel status table D102 in FIG. 4, when a channel CH1 is used, since the forwarding channel of a communication terminal Node 2 does not satisfy the required bandwidth, the channel CH1 is determined to be mismatching. However, when a channel CH2 is used, all the channels denoted by the forwarding channel identifier satisfy the required bandwidth. Thus, the channel CH2 is described in the matching channel information D103. In this way, the channels that can be used for data forwarding are selected.

The channel selection unit A133 stores the generated matching channel information D103 in the channel status management unit A122. If no channel satisfying the request exists in the matching channel information D103 which is obtained as a result of the channel calculation, the channel selection unit A133 may select a channel having a bandwidth corresponding to a certain ratio or more of the required bandwidth or a channel in which the forwarding channels of at least a certain number of communication terminals satisfy the required bandwidth and create the matching channel information D103. Subsequently, the channel selection unit A133 transmits notification of start of selection of a forwarding channel to the broadcast distribution path selection unit A134. By executing the above operation, a channel that can be used for data re-forwarding is selected.

The broadcast distribution path selection unit A134 limits the channels that can be used for selecting a forwarding channel based on the matching channel information D103 and selects a forwarding channel in accordance with a broadcast distribution path selection algorithm. When receiving the notification of start of selection of a forwarding channel from the channel selection unit A133, the broadcast distribution path selection unit A134 reads the matching channel information D103 from the channel status management unit A122, selects a forwarding channel used as a broadcast distribution path from among the available channels, and stores the forwarding channel in the channel status management unit A122.

As the broadcast distribution path selection algorithm, various algorithms can be used depending on a path to be established (a tree structure, an MPR (Multipoint Relay) group, etc.) and depending on a request about a forwarding path (bandwidth maximization or equalization). In addition, a method for selecting a forwarding channel differs per algorithm.

In the present exemplary embodiment, as an example, the broadcast distribution path selection unit A134 selects, from among the matching channels, a channel that covers unforwarded communication terminals and that achieves a large capacity as a forwarding channel to a neighboring terminal.

To select a communication terminal having many neighboring terminals or a communication terminal having many unforwarded terminals, it is only necessary to cause the broadcast distribution path selection unit A134 to read the neighboring terminal information or the destination terminal information from the data storage unit A121, to grasp the channels that can be used by its own communication terminal for selecting a forwarding channel from the matching channel information D103, and to select a channel having the largest number of neighboring terminals or unforwarded terminals from among the available channels. In this way, a broadcast distribution path of a minimum forwarding operation number satisfying a required bandwidth can be established.

Figure 6:
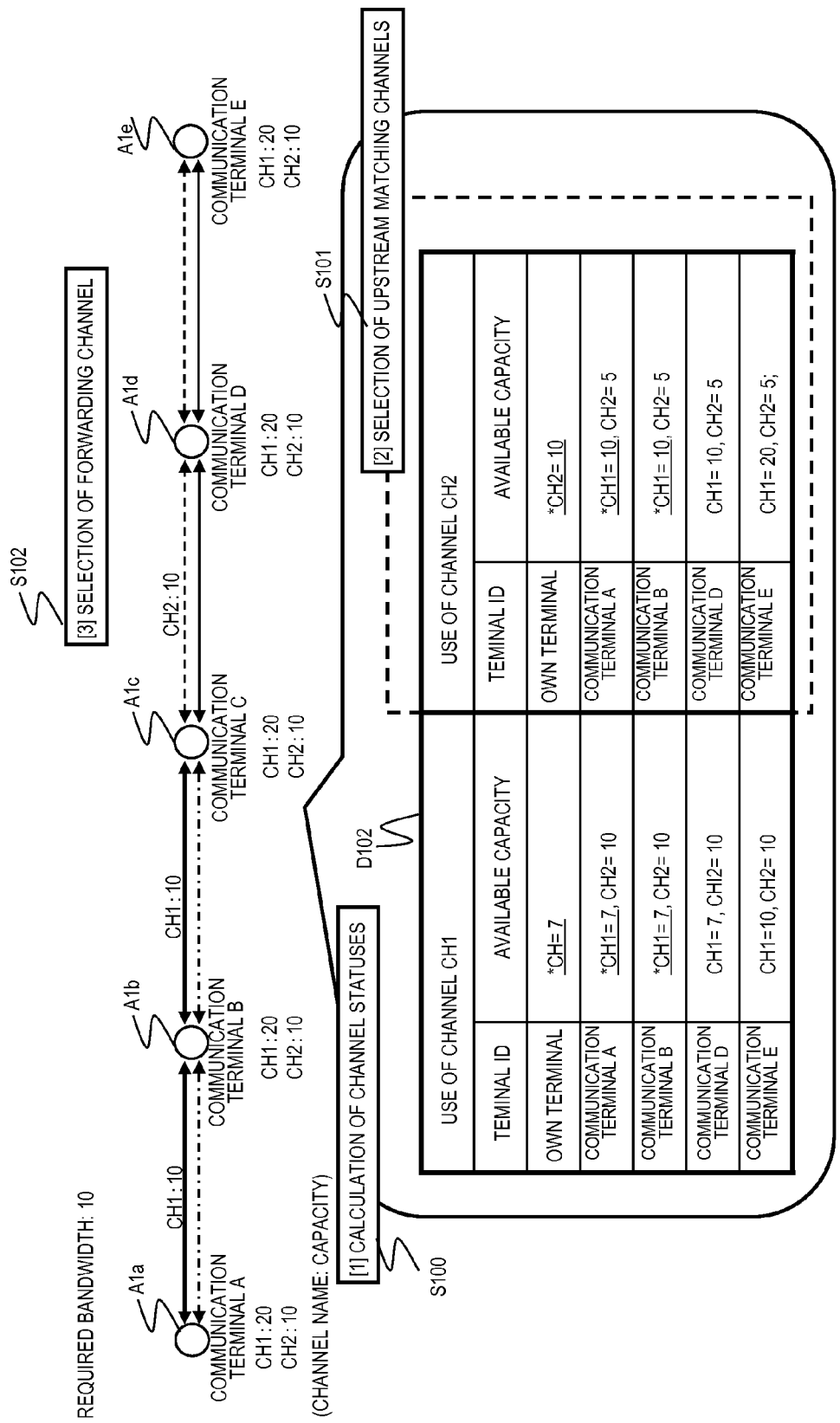
FIG. 6 illustrates an operation of the communication terminal according to the first exemplary embodiment.
Figure 7:
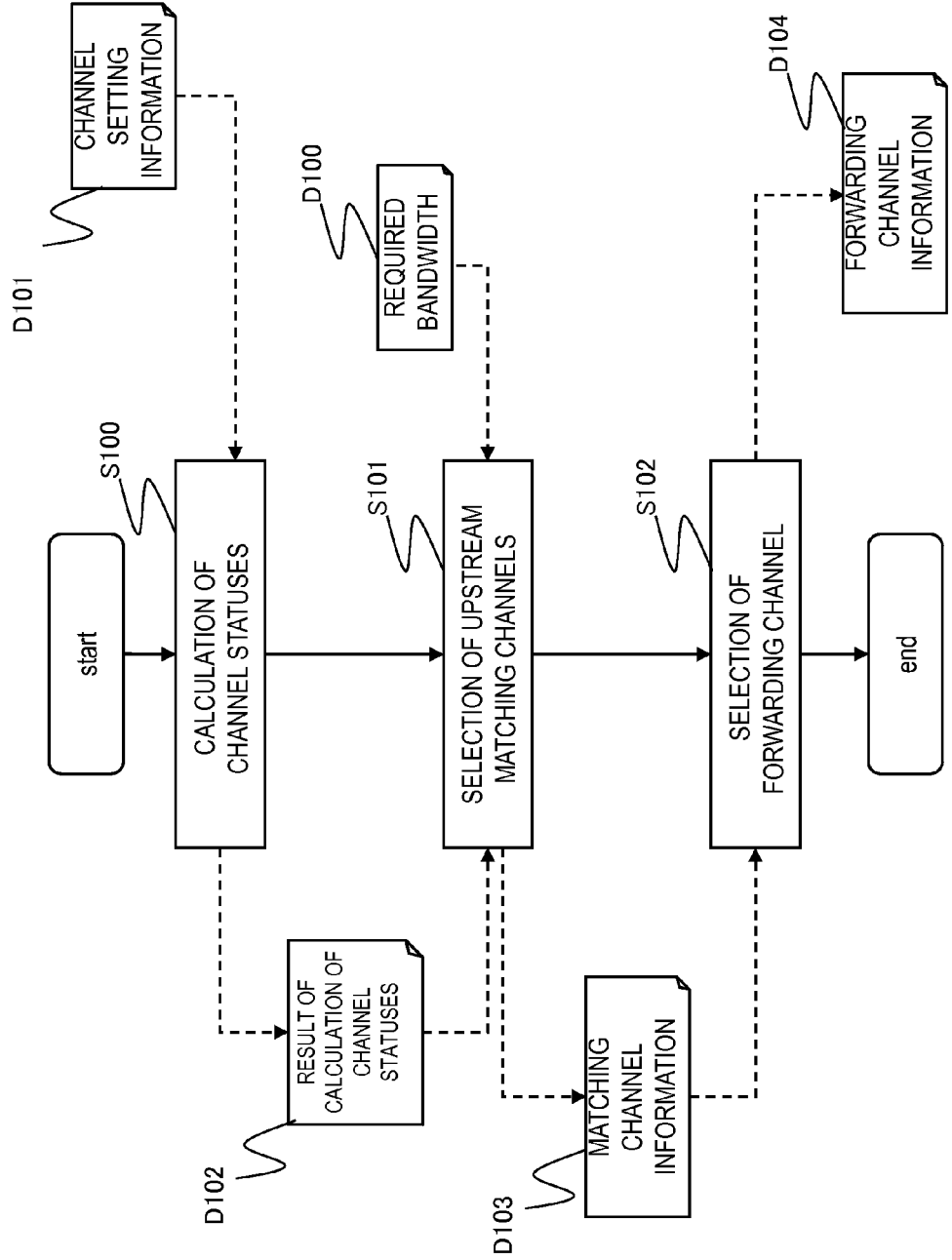
FIG. 7 is a flow chart illustrating an operation of the communication terminal according to the first exemplary embodiment.

FIG. 6 illustrates an operation of the communication terminal according to the present exemplary embodiment. FIG. 7 is a flow chart illustrating an operation of the communication terminal according to the present exemplary embodiment. An operation of selecting a channel in which forwarding channels of other communication terminals and a forwarding channel of its own terminal satisfy a required bandwidth as a forwarding channel that can be used for data re-forwarding will be described with reference to FIGS. 6 and 7.

Channels CH1 and CH2 used for communication are allocated to wireless interfaces of each of the communication terminals A1$a$ to A1$e$ illustrated in FIG. 6. The communication terminals A1$a$ to A1$e$ establish an ad hoc network in which communication is possible only between adjacent communication terminals. Each of the communication terminals can execute communication by using the channels CH1 and CH2. In addition, each of the communication terminals has already been notified that the required bandwidth of a forwarding channel serving as a broadcast distribution path is 10. In addition, the terminals A1$a$ to A1$e$ select a forwarding channel sequentially in this order. In addition, the communication terminals A1$a$ and A1$b$ have already selected the channel CH1 as a forwarding channel.

Next, the terminal A1$c$ starts selecting a forwarding channel. The communication terminal A1$c$ selects channels in which the forwarding channels of the communication terminals A1$a$ and A1$b$ that have already selected forwarding channels satisfy the required bandwidth and in which a forwarding channel of the terminal A1$c$ also satisfies the required bandwidth as a channel that can be used for selecting a forwarding channel from among the channels CH1 and CH2 that can be used by the terminal A1$c$. Next, the communication terminal A1$c$ determines a forwarding channel for re-forwarding data. An operation of selecting a channel by the communication terminal A1$c$ will be described with reference to FIG. 7.

First, the communication terminal A1$c$ notifies the forwarding bandwidth request unit A131 of the required bandwidth D100 about a forwarding channel and starts selecting channels that can be used as a forwarding channel by using the forwarding bandwidth request unit A131.

The forwarding bandwidth request unit A131 transmits notification of start of calculation of channel statuses to the channel status calculation unit A132 and starts calculating changes of capacities of forwarding channels of the other communication terminals when the communication terminal A1$c$ sets a forwarding channel (step S100). In addition, the forwarding bandwidth request unit A131 notifies the channel selection unit A133 of the required bandwidth D100.

In the step of calculating channel statuses (step S100), the channel status calculation unit A132 calculates the amount of decrease in the capacity of each of the channels of the neighboring communication terminals when the communication terminal A1c sets a forwarding channel.

When receiving the notification of start of calculation of channel statuses from the forwarding bandwidth request unit A131, the channel status calculation unit A132 reads the channel setting information D101 about the neighboring terminals from the channel status management unit A122 (channel allocation statuses and forwarding channel settings of the communication terminals A1a to A1e and the number of neighboring forwarding channel setting terminals near these communication terminals A1a to A1e). Subsequently, the channel status calculation unit A132 calculates a capacity actually obtained by the communication terminal A1c and capacities of forwarding channels of the other communication terminals for all the channels that can be used by the communication terminal A1c.

In the present exemplary embodiment, the communication terminal A1c can use the channels CH1 and CH2. In the calculation of the channel statuses in step S100, the channel status calculation unit A132 calculates capacity changes when each of the channels CH1 and CH2 is used in accordance with formulas (1) to (3) and obtains the channel status calculation result D102 illustrated in FIG. 6.

After finishing the calculation of the channel statuses (step S100), the channel status calculation unit A132 transmits the channel status table D102 and a notification of selection of channels to the channel selection unit A133. Accordingly, selection of upstream matching channels (step S101) is started.

In a step of selecting upstream matching channels (step S101), the channel selection unit A133 selects channels that can be used for selecting a broadcast distribution path.

The channel selection unit A133 uses the required bandwidth D100 supplied from the bandwidth request unit A131 and the channel status table D102 supplied from the channel status calculation unit A132 to determine whether each capacity denoted by the forwarding channel identifier in the channel calculation result D102 satisfies the required bandwidth.

For example, in FIG. 6, if the communication terminal A1c uses the channel CH1, the capacities of the communication terminal A1c and the forwarding channels that have already been set do not satisfy the required bandwidth. In contrast, if the communication terminal A1c uses the channel CH2, the capacities of the communication terminal A1c and the forwarding channels that have already been set satisfy the required bandwidth. Thus, the channel selection unit A133 selects the channel CH2 as a channel that can be used as a forwarding channel and generates the matching channel information D103 in which information about the channel CH2 is described.

After finishing the step of selecting upstream matching channels (step S101), the channel selection unit A133 stores the matching channel information D103 in the channel status management unit A122 and transmits a notification of start of selection of a broadcast distribution path to the broadcast distribution path selection unit A134.

In the above process, before a forwarding channel is determined in accordance with a broadcast distribution path algorithm, channels in which forwarding channels of the other communication terminals and a forwarding channel of the communication terminal A1c satisfy the required bandwidth can be selected as channels that can be used as a forwarding channel.

To actually select a forwarding channel used as a broadcast distribution path, a forwarding channel selection step (step S102) in FIG. 7 is executed. Namely, the broadcast communication path selection unit A134 executes a broadcast distribution algorithm and selects a forwarding channel from among the channels described in the matching channel information D103 obtained by the above process.

In the forwarding channel selection step S102, the broadcast distribution path selection unit A134 selects a forwarding channel in accordance with a predetermined algorithm.

After finishing the step of selecting upstream matching channels (step S101) and receiving the notification of start of selection of a broadcast distribution path from the channel selection unit A133, the broadcast distribution path selection unit A134 reads the matching channel information D103 from the channel status management unit A122 and selects a forwarding channel.

In the present exemplary embodiment, a channel that can be used for selecting a forwarding channel described in the matching channel information D103 is the channel CH2 alone. Thus, the broadcast distribution path selection unit A134 determines the channel CH2 to be the forwarding channel.

The broadcast distribution path selection unit A134 selects the channel CH2 as the forwarding channel, generates forwarding channel information D104 indicating that the channel CH2 is to be used as the broadcast distribution path forwarding channel, and stores the information in the channel status management unit A122.

By reading the forwarding channel information D104 stored in the channel status management unit A122, when data re-forwarding is necessary, an application or a protocol executing path control can determine a channel for re-forwarding and execute data re-forwarding.

In addition, when selecting a forwarding channel, to achieve a minimum forwarding operation number, there are cases where a forwarding channel needs to be determined based on the number of neighboring terminals. In such cases, it is only necessary to cause the broadcast distribution path selection unit A134 to read the neighboring terminal information from the data storage unit A121. In addition, the broadcast distribution path selection unit A134 selects a channel having a maximum number of neighboring terminals from among the channels that can be used as a forwarding channel described in the matching channel information D103. In such cases, a broadcast distribution path satisfying the required bandwidth and having a minimum forwarding number can be established.

Thus, before a forwarding channel is determined in accordance with a broadcast distribution path selection algorithm, by selecting channels that can be used as a forwarding channel, forwarding channels that have already been set by the other communication terminals can satisfy the required bandwidth.

The communication terminal according to the present exemplary embodiment is applicable to cases other than the case where a forwarding channel is selected for broadcast distribution. For example, the communication terminal according to the present exemplary embodiment is applicable to when selecting a communication path (forwarding channel) to a certain destination or when selecting a forwarding path satisfying a required bandwidth in a multicast including a plurality of destinations.

Second Exemplary Embodiment

Next, a communication terminal according to a second exemplary embodiment will be described in detail with reference to the drawings.

In the first exemplary embodiment, a channel that can be used for selecting a forwarding channel is selected so that the capacities of forwarding channels already set by the other communication terminals and the capacity of a forwarding channel of the own terminal satisfy a required bandwidth. In contrast, in the present exemplary embodiment, a channel that can be used for selecting a forwarding channel is selected so that the own terminal and the other communication terminals that have not set a forwarding channel yet satisfy a required bandwidth.

Figure 8:
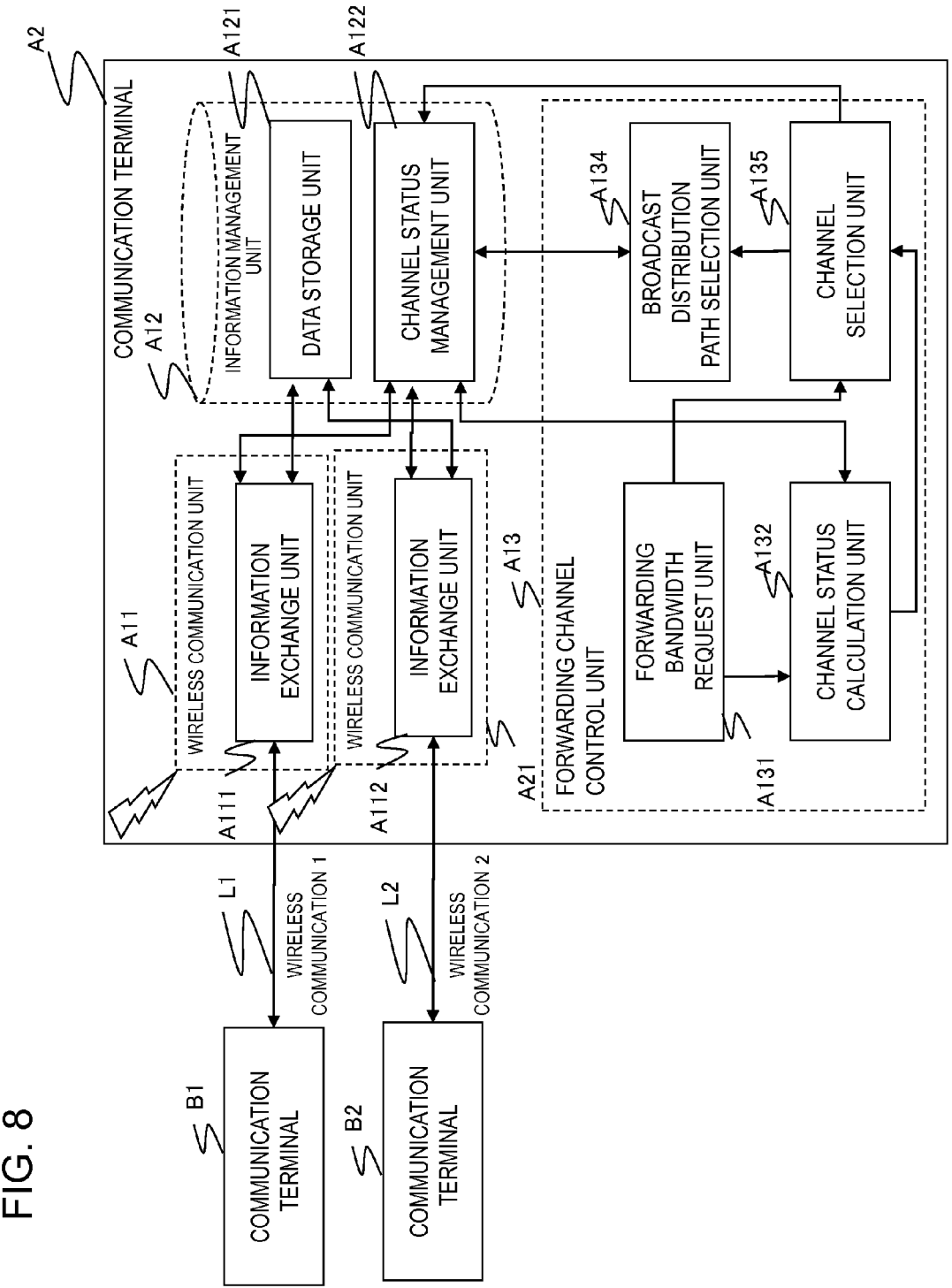
FIG. 8 is a block diagram illustrating a configuration of a communication terminal according to a second exemplary embodiment.

FIG. 8 is a block diagram illustrating a configuration of a communication terminal A2 according to the present exemplary embodiment. With reference to FIG. 8, the forwarding channel control unit A13 of the communication terminal A2 includes a channel selection unit A135, instead of the channel selection unit A133 (FIG. 1) of the communication terminal A1 according to the first exemplary embodiment.

By using the channel status table D102 outputted from the channel status calculation unit A132, the channel selection unit A135 selects a channel that can be used as a forwarding channel so that the own terminal and the other communication terminals that have not set a forwarding channel yet satisfy a required bandwidth.

For example, when receiving the channel status table D102 from the channel status calculation unit A132, the channel selection unit A135 searches the channel status table D102 for communication terminals that do not have a channel denoted by the forwarding channel identifier (for example, a communication terminal Node 3 in FIG. 4). In addition, the channel selection unit A135 selects at least one of the channels that can be used by the retrieved communication terminals. In this operation, in each channel selected by the channel selection unit A135, the capacities of the retrieved communication terminals and the own terminal satisfy a required bandwidth or more.

Next, the channel selection unit A135 generates the matching channel information D103 in which information about the corresponding channels is described and stores the information in the channel status management unit A122. In addition, the channel selection unit A135 transmits a notification of start of selection of a forwarding channel to the broadcast distribution path selection unit A134.

If no channel satisfying the condition exists in the channel status table D102, the channel selection unit A135 may select channels each achieving a capacity corresponding to a certain ratio or more of the required bandwidth or channels in which at least a certain number of communication terminals satisfy the required bandwidth. In this case, the channel selection unit A135 generates the matching channel information D103 in which information about the corresponding channels is described.

Figure 9:
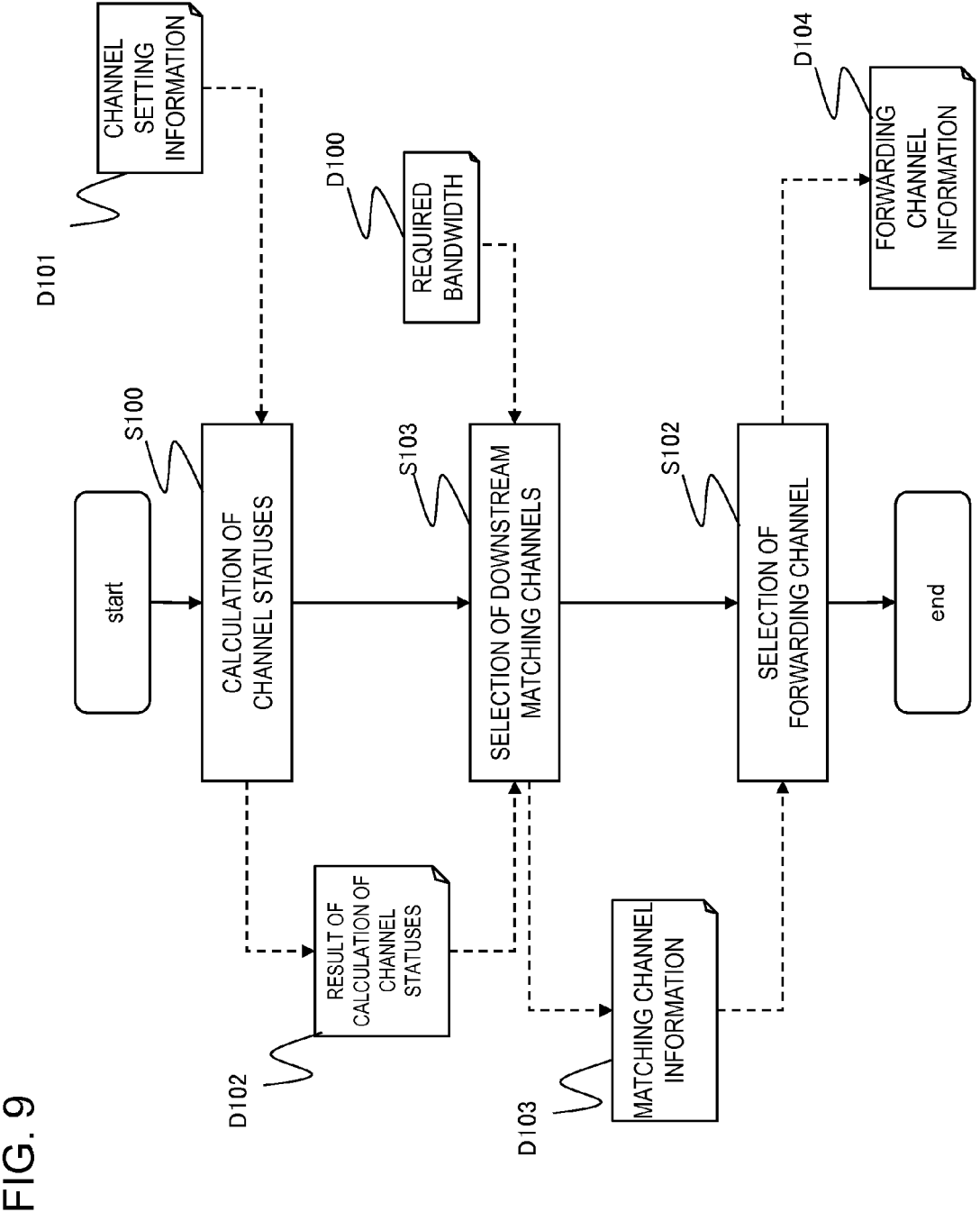
FIG. 9 is a flow chart illustrating an operation of the communication terminal according to the second exemplary embodiment.

An operation of the communication terminal A2 according to the present exemplary embodiment will be described with reference to the drawings. FIG. 9 is a flow chart illustrating an operation of the communication terminal A2. With reference to FIG. 9, in the present exemplary embodiment, a step of selecting downstream matching channels (step S103) is executed, instead of the step of selecting upstream matching channels (step S101 in FIG. 7) in the first exemplary embodiment.

Since the step of calculating channel statuses (step S100) by the channel status calculation unit A132 and the step of selecting a forwarding channel (step S102) by the broadcast distribution path selection unit A134 are the same as those (FIG. 7) according to the first exemplary embodiment, description thereof will be omitted.

Figure 10:
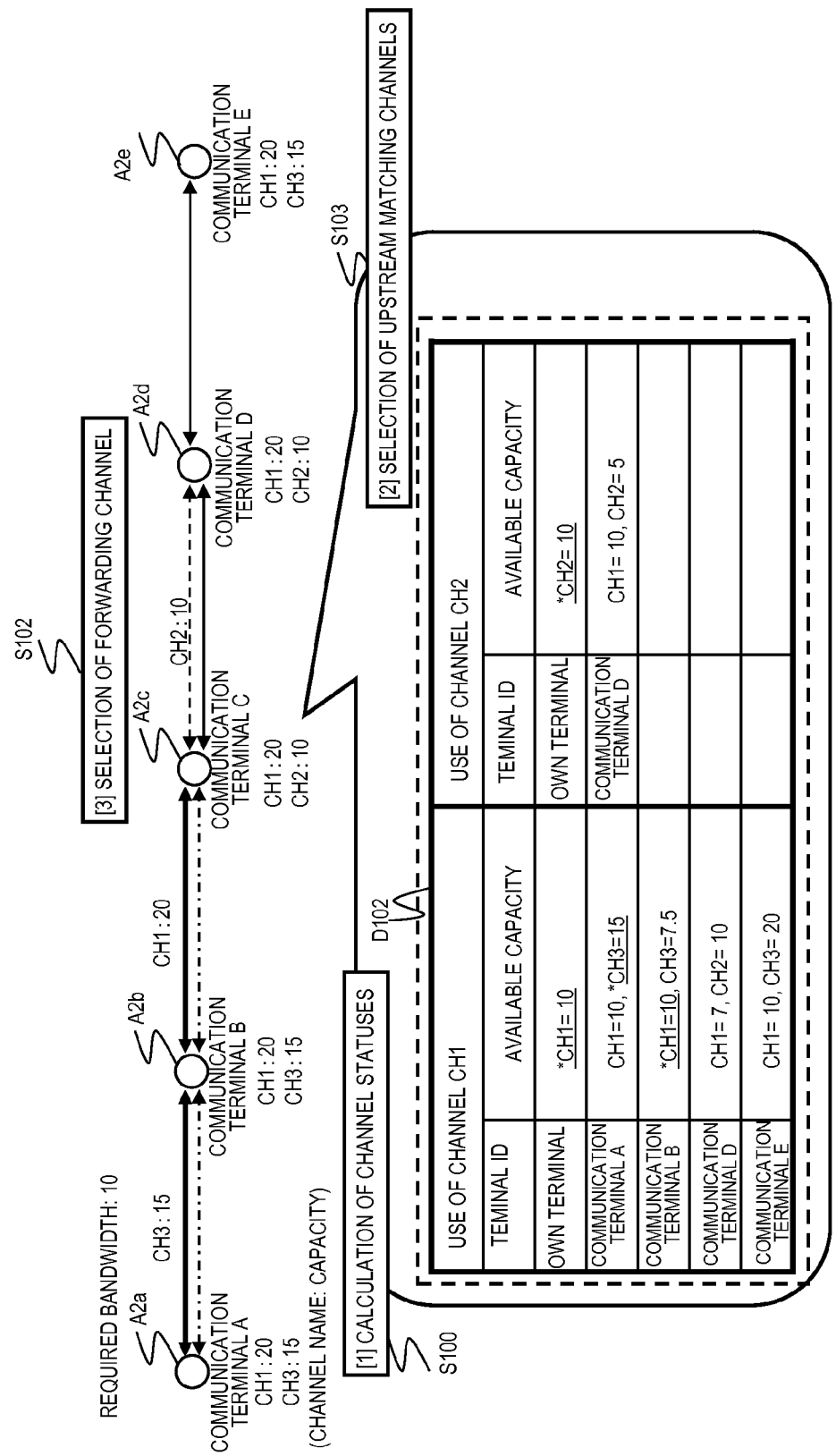
FIG. 10 illustrates an operation of the communication terminal according to the second exemplary embodiment.

FIG. 10 illustrates an operation of the communication terminal A2. With reference to FIG. 10, the communication terminals A2a to A2e have already allocated channels used for communication to the respective wireless interfaces of the communication terminals A2a to A2e and established an ad hoc network in which communication is possible only between neighboring communication terminals as in exemplary embodiment 1. Channels CH1 and CH2 have been allocated to the communication terminals A2c and A2d, and channels CH1 and CH3 have been allocated to the communication terminals A2a, A2b, and A2e. In addition, each of the communication terminals has already been notified that the required bandwidth for a channel forwarding data is 10. In addition, the terminals A2a to A2e select a forwarding channel sequentially in this order. In addition, the communication terminals A2a and A2b have already selected a forwarding channel. Next, the communication terminal A2c starts selecting a forwarding channel.

After selecting channels that can be used as a forwarding channel from among the channels that can be used by the communication terminal A2c, the communication terminal A2c determines a forwarding channel in accordance with a broadcast distribution path algorithm. As in exemplary embodiment 1, the communication terminal A2c transmits the required bandwidth D100 to the forwarding bandwidth request unit A131, starts selecting channels that can be used as a forwarding channel by using the forwarding bandwidth request unit A131, and calculates the channel statuses (step S100).

In the present exemplary embodiment, the communication terminal A2c can use the channels CH1 and CH2. Thus, the channel status calculation unit A132 calculates, when the communication terminal A2c uses each of the channels CH1 and CH2 as a forwarding channel, capacities of the channels that can be used by other communication terminals within an interference range, that is, within two hops from the communication terminal A2c.

After finishing the channel status calculation step S100, the channel status calculation unit A132 generates the channel status table D102 in FIG. 10 and transmits the generated channel status table D102 to the channel selection unit A135. Next, the channel selection unit A135 starts a step of selecting downstream matching channels (step S103).

In the step of selecting downstream matching channels (step S103), the channel selection unit A135 selects channels that can be used as a forwarding channel from the channel status table D102 and the required bandwidth D100.

First, the channel selection unit A135 searches the channel calculation result D102 for communication terminals that do not have channels denoted by the forwarding channel identifier. In the present exemplary embodiment, such communication terminals correspond to communication terminals A2d and A2e described in the channel status table D102 in FIG. 10.

Next, the channel selection unit A135 determines the capacities obtained by the communication terminal A2c and capacities of the channels that can be used by the communication terminals A2d and A2e when the communication terminal A2c uses the channels CH1 and CH2, which are the channels that can be used thereby. Next, the channel selection unit A135 selects a channel so that a forwarding channel between the communications terminals A2c and A2d selected by the communication terminal A2c and a forwarding channel between the communication terminals A2d and A2e selected by the communication terminal A2d satisfy the required bandwidth.

For example, in the channel status table D102 in FIG. 10, the capacity obtained by the communication terminal A2c, which is the own communication terminal, satisfies the required bandwidth in both the channels CH1 and CH2. In addition, the communication terminals A2d and A2e that have not set a forwarding channel yet have at least one channel satisfying the required bandwidth even when the communication terminal A2c uses either the channel CH1 or CH2.

Thus, the channel selection unit A135 selects the channels CH1 and CH2 satisfying the condition as channels that can be used as a forwarding channel, generates the matching channel information D103 in which information about the channels CH1 and CH2 is described, and stores the matching channel information D103 in the channel status management unit A122. Next, the channel selection unit A135 transmits a notification of start of selection of a forwarding channel to the broadcast distribution path selection unit A134. Accordingly, a step of selecting a forwarding channel (step S102) is started.

In the forwarding channel selection step S102, the broadcast distribution path selection unit A134 and the matching channel information D103 are used to determine a forwarding channel in the same way as in exemplary embodiment 1. The broadcast distribution path selection unit A134 selects a channel achieving a large capacity and covering unforwarded communication terminals. In the present exemplary embodiment, the same capacity is obtained between the channels CH1 and CH2. Thus, the broadcast distribution path selection unit A134 selects one of the channels CH1 and CH2.

In the above step of selecting downstream matching channels (step S103), as long as each of the other communication terminals that have not set a forwarding channel has at least one channel satisfying the required bandwidth, the corresponding information is described in the matching channel information D103. However, the matching channels may be narrowed down, based on a connection relationship between communication terminals. For example, in FIG. 10, the communication terminals A2d and A2e are connected by the channel CH1 alone. Thus, only the channel CH2 may be selected as a matching channel so that CH1 of the terminal A2d satisfies the required bandwidth. In this way, a broadcast distribution path satisfying the required bandwidth can be established more accurately.

Thus, before a forwarding channel is determined in accordance with a broadcast distribution path selection algorithm, by selecting channels that can be used as a forwarding channel, a forwarding channel in which the other communication terminals satisfy a required bandwidth can be selected.

The communication terminal A2 according to the present exemplary embodiment is applicable to cases other than the case where a forwarding channel is selected for broadcast distribution. For example, the communication terminal A2 according to the present exemplary embodiment is applicable to when selecting a communication path (forwarding channel) to a certain destination or when selecting a forwarding path satisfying a required bandwidth in a multicast including a plurality of destinations.

Third Exemplary Embodiment

Next, a communication terminal according to a third exemplary embodiment will be described in detail with reference to the drawings.

In the first exemplary embodiment, channels that can be used for selecting a forwarding channel are selected so that the capacities of forwarding channels that have already been set by other communication terminals and the capacity of a forwarding channel of the own terminal satisfy a required bandwidth. In addition, in the second exemplary embodiment, channels that can be used for selecting a forwarding channel are selected so that the own terminal and other communication terminals that have not set a forwarding channel yet have channels satisfying a required bandwidth.

In contrast, in the present exemplary embodiment, channels that can be used for selecting a forwarding channel are selected so that the capacity of a forwarding channel of the own terminal and forwarding channels that have already been set by other communication terminals satisfy a required bandwidth and the other communication terminals that have not set a forwarding channel yet have channels satisfying the required bandwidth.

Figure 11:
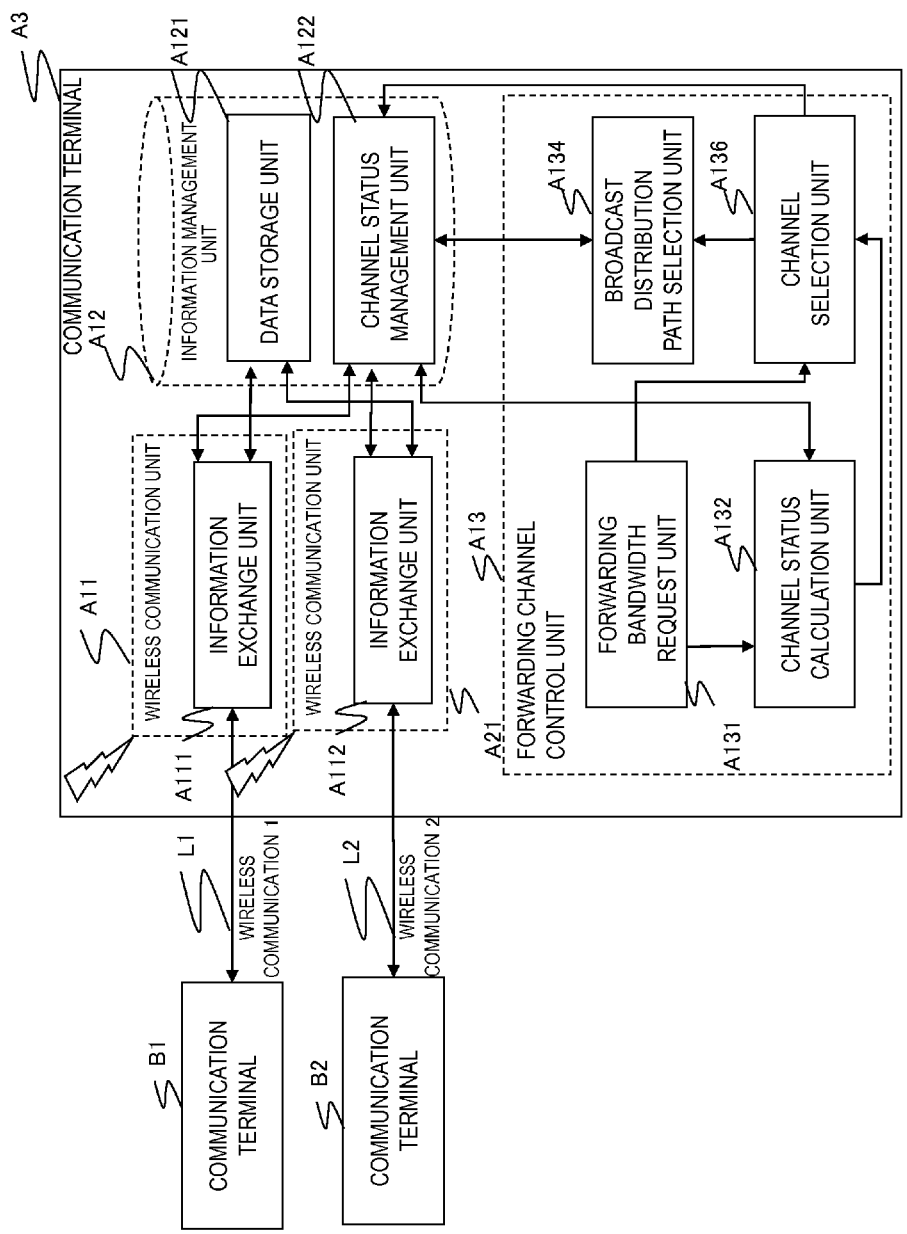
FIG. 11 is a block diagram illustrating a configuration of a communication terminal according to a third exemplary embodiment.

FIG. 11 is a block diagram illustrating a configuration of a communication terminal A3 according to the present exemplary embodiment. With reference to FIG. 11, the forwarding channel control unit A13 of the communication terminal A3 includes a channel selection unit A136, instead of the channel selection unit A133 (FIG. 1) of the communication terminal A1 according to the first exemplary embodiment or the channel selection unit A135 (FIG. 8) of the communication terminal A2 according to the second exemplary embodiment.

By using the channel status table D102 outputted from the channel status calculation unit A132, the channel selection unit A136 selects channels that can be used as a forwarding channel so that capacities of the communication terminal A3 and forwarding channels that have already been set by the other communication terminals satisfy a required bandwidth and other communication terminals satisfy the required bandwidth.

For example, when receiving the channel status table D102 from the channel status calculation unit A132, the channel selection unit A136 refers to the channel status table D102 to search for channels denoted by the forwarding channel identifier and communication terminals that do not have channels denoted by the forwarding channel identifier. In addition, from among the channels and communication terminals, the channel selection unit A136 selects channels satisfying the conditions described in the first and second exemplary embodiments and outputs the channels satisfying both of the conditions as the matching channel information D103.

Namely, from among the retrieved channels denoted by a forwarding channel and the retrieved communication terminals that have not set a forwarding channel, the channel selection unit A136 selects a channel as a channel that can be used as a forwarding channel. This selected channel is one of the channels that are denoted by the forwarding channel identifier and that satisfy a required bandwidth. In addition, this selected channel is at least one of the channels which can be used by the communication terminals that have not set a forwarding channel and which satisfy the required bandwidth. In addition, in this selected channel, the capacity of a forwarding channel of the own terminal satisfies the required bandwidth.

Next, the channel selection unit A136 generates the matching channel information D103 in which information about the corresponding channel is described and stores the matching channel information D103 in the channel status management unit A122. In addition, the channel selection unit A136 transmits a notification of start of selection of a forwarding channel to the broadcast distribution path selection unit A134.

If no channel satisfying the conditions exists, the channel selection unit A136 may select channels achieving a capacity corresponding to a certain ratio or more of the required bandwidth or channels in which at least a certain number of communication terminals satisfy the condition. In this case, the channel selection unit A136 generates the matching channel information D103 in which information about the corresponding channels is described.

Figure 12:
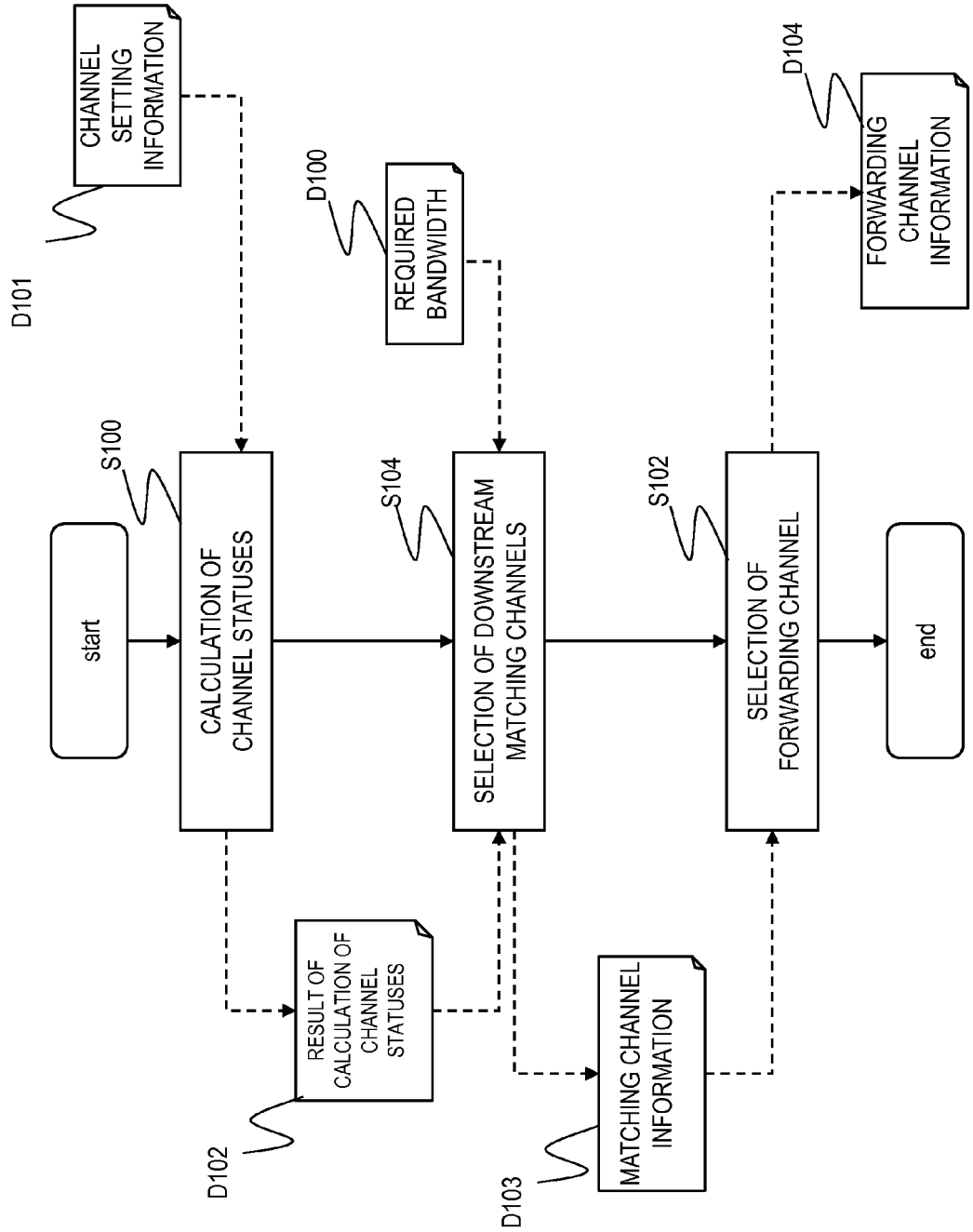
FIG. 12 is a flow chart illustrating an operation of the communication terminal according to the third exemplary embodiment.

An operation of the communication terminal A3 according to the present exemplary embodiment will be described with reference to the drawings. FIG. 12 is a flow chart illustrating an operation of the communication terminal A3. With reference to FIG. 12, in the present exemplary embodiment, a step of selecting matching channels (step S104) is executed, instead of the step of selecting upstream matching channels (step S101 in FIG. 7) according to the first exemplary embodiment and the step of selecting downstream matching channels (step S103 in FIG. 9) according to the second exemplary embodiment.

The step of calculating channel statuses (step S100) by the channel status calculation unit A132 and the step of selecting a forwarding channel (step S102) by the broadcast distribution path selection unit A134 are the same as those (FIG. 7) according to the first exemplary embodiment, description thereof will be omitted.

Figure 13:
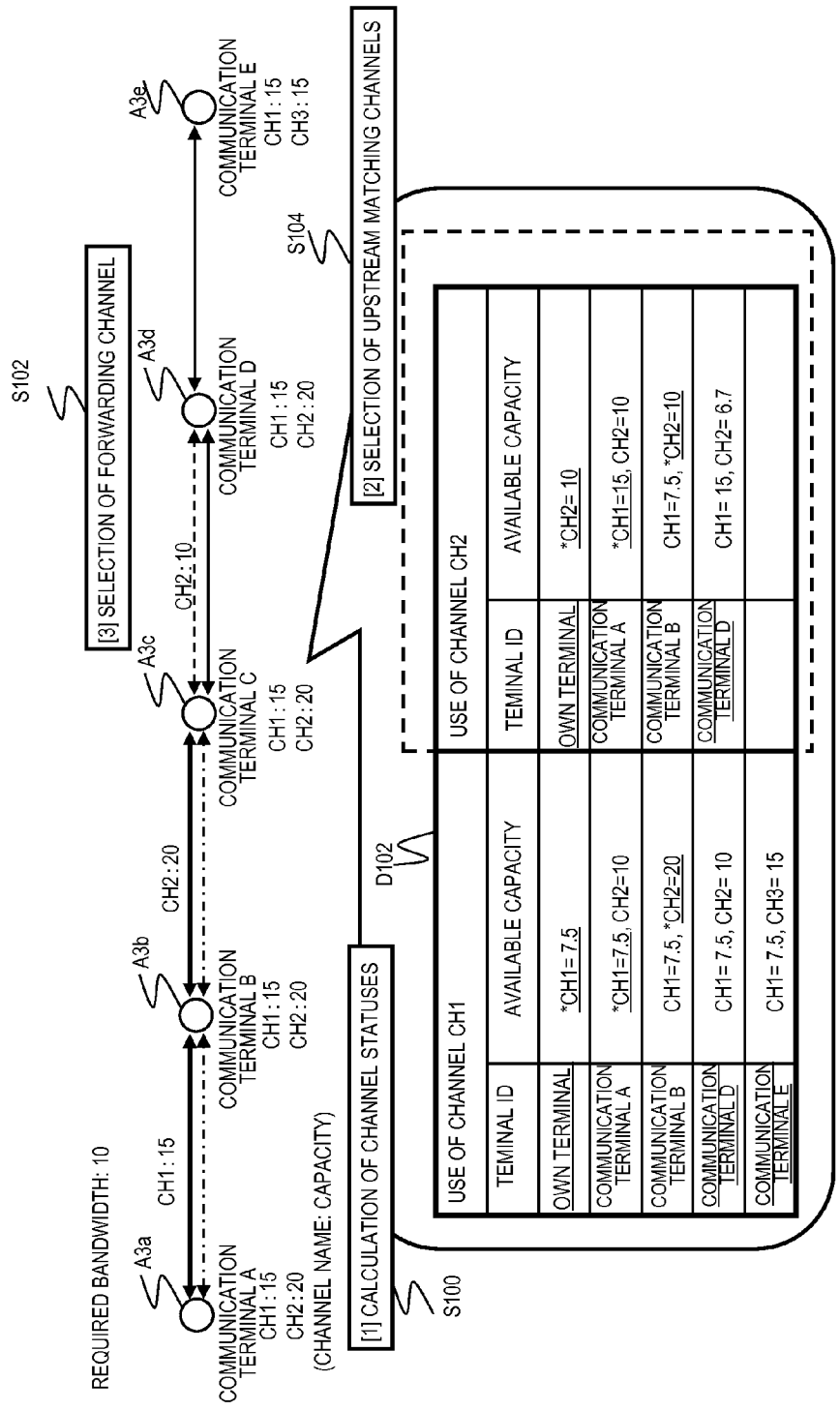
FIG. 13 illustrates an operation of the communication terminal according to the third exemplary embodiment.

FIG. 13 illustrates an operation of the communication terminal A3. With reference to FIG. 13, as in exemplary embodiments 1 and 2, the communication terminals A3$a$ to A3$e$ have already allocated channels used for communication to the respective wireless interfaces of the communication terminals A3$a$ to A3$e$ and established an ad hoc network in which communication is possible only between neighboring communication terminals as in exemplary embodiments 1 and 2. Channels CH1 and CH2 have already been allocated to the communication terminals A3$a$ to A3$d$, and channels CH1 and CH3 have already been allocated to the communication terminal A3$e$. In addition, each of the communication terminals has already been notified that the required bandwidth for a channel forwarding data is 10. In addition, the terminals A3$a$ to A3$e$ select a forwarding channel sequentially in this order. In addition, the communication terminals A3$a$ and A3$b$ have already selected a forwarding channel. Next, the communication terminal A3$c$ starts selecting a forwarding channel.

After determining channels that can be used as a forwarding channel from among the channels that can be used by the communication terminal A3$c$, the communication terminal A3$c$ determines a forwarding channel in accordance with a broadcast distribution path algorithm. As in exemplary embodiments 1 and 2, the communication terminal A3$c$ transmits the required bandwidth D100 to the forwarding bandwidth request unit A131, starts determining channels that can be used as a forwarding channel by using the forwarding bandwidth request unit A131, and calculates the channel statuses (step S100).

After finishing the channel status calculation step S100 and the channel status calculation unit A132 transmits the channel status table D102 to the channel selection unit A136, the channel selection unit A136 starts a step of selecting matching channels (step S104).

In the matching channel selection step (step S104), the channel selection unit A136 uses the channel status table D102 and the required bandwidth D100 to select channels that can be used as a forwarding channel. For example, the channel selection unit A136 refers to the channel status table D102 and selects a forwarding channel from among the channels that can be used by the communication terminal A3$c$. A forwarding channel is selected so that, when the communication terminal A3$c$ sets the forwarding channel, the capacity of the forwarding channel of the communication terminal A3$c$ and the capacities of channels denoted by the forwarding channel identifier satisfy the required bandwidth and at least one of the channels that can be used by communication terminals that do not have channels denoted by the forwarding channel identifier satisfies the required bandwidth.

For example, in the channel status table D102 in FIG. 13, if the communication terminal A3$c$, which is the own communication terminal, uses the channel CH1 that can be used thereby, the capacities of channels denoted by the forwarding channel identifier do not satisfy the required bandwidth. In addition, the communication terminals A3$d$ and A3$e$ that do not have channels denoted by the forwarding channel identifier have at least one channel satisfying the required bandwidth, even if the communication terminal A1$c$ uses either the channel CH1 or CH2. Thus, the channel selection unit A136 determines the channel CH1 that does not satisfy the above two conditions to be mismatching, determines that the channel CH2 satisfying the two conditions can be used as a forwarding channel, and adds information about the channel CH2 in the matching channel information D103.

After finishing the matching channel selection step S104, the channel selection unit A136 stores the matching channel information D103 in the channel information management unit A122. Next, the channel selection unit A136 transmits a notification of start of selection of a forwarding channel to the broadcast distribution path selection unit A134. Accordingly, a step of selecting a forwarding channel (step S102) is started. Next, as in exemplary embodiments 1 and 2, a forwarding channel is selected.

As described above, before a forwarding channel is determined in accordance with a broadcast distribution path selection algorithm, channels that can be used as a forwarding channel are selected. As a result, it is possible to select a forwarding channel in which previously-selected forwarding channels satisfy a required bandwidth and other communication terminals satisfy the required bandwidth.

The communication terminal A3 according to the present exemplary embodiment is applicable to cases other than the case where a forwarding channel is selected for broadcast distribution. For example, the communication terminal A3 according to the present exemplary embodiment is applicable to when selecting a communication path (forwarding channel) to a certain destination or when selecting a forwarding path satisfying a required bandwidth in a multicast including a plurality of destinations.

Modifications and adjustments of the exemplary embodiments are possible within the scope of the overall disclosure (including the claims) of the present invention and based on the basic technical concept of the present invention. Various combinations and selections of various disclosed elements (including the elements in each of the claims, exemplary embodiments, drawings, etc.) are possible within the scope of the claims of the present invention. That is, the present invention of course includes various variations and modifications that could be made by those skilled in the art according to the overall disclosure including the claims and the technical concept. Particularly, any numerical range disclosed herein should be interpreted that any intermediate values or subranges falling within the disclosed range are also concretely disclosed even without specific recital thereof.

L1, L2 wireless communication
A1, A1a to A1e, A2, A2a to A2e, A3, A3a to A3e communication terminal
A11, A21 wireless communication unit
A12 information management unit
A13 forwarding channel control unit
A1x, A1y communication terminal
A111, A112 information exchange unit
A121 data storage unit
A122 channel status management unit
A131 forwarding bandwidth request unit
A132 channel status calculation unit
A133 channel selection unit
A134 broadcast distribution path selection unit
A135 channel selection unit
A136 channel selection unit
B1, B2 communication terminal
CH1 to CH4 channel
D100 required bandwidth
D101 channel setting information
D102 channel status table
D103 matching channel information
D104 forwarding channel information
Node 1 to Node 3 communication terminal

What is claimed is:

1. A communication terminal, comprising:
a wireless communicator to which a plurality of channels are allocated; and
at least one computer which implements:
a channel status calculation unit that calculates, based on a maximum capacity that is predetermined for the one channel and a number of other communication terminals that have set the one channel as a forwarding channel, a first capacity that can be used in one of the plurality of channels by the communication terminal and a second capacity that can be used in the one channel by another communication terminal; and
a channel selection unit that determines, when the one channel is set as a forwarding channel, whether the first capacity that can be used in the one channel by the communication terminal satisfies a required bandwidth, and determines, when another communication terminal has set the one channel as a forwarding channel, whether the second capacity that can be used in the one channel by the another communication terminal satisfies the required bandwidth.

2. The communication terminal according to claim 1, wherein
the channel selection unit determines whether a capacity of at least one channel among the plurality of channels, which is allocated to another communication terminal that has not set a forwarding channel yet, satisfies the required bandwidth.

3. The communication terminal according to claim 1, further comprising:
a channel status table that stores a channel allocated to a wireless communicator of another communication terminal and an identifier indicating whether the another communication terminal has already set the channel as a forwarding channel.

4. The communication terminal according to claim 1, wherein
the another communication terminal is a second communication terminal that is affected by channel interference when one of the plurality of channels is used.

5. A channel selection method, comprising:
by a communication terminal including a wireless communicator to which a plurality of channels are allocated, calculating, based on a maximum capacity that is predetermined for the one channel and a number of other communication terminals that have set the one channel as a forwarding channel, a first capacity that can be used in one of the plurality of channels by the communication terminal and a second capacity that can be used in the one channel by another communication terminal; and
determining, when the one channel is set as a forwarding channel, whether the first capacity that can be used in the one channel by the communication terminal satisfies a required bandwidth, and determining, when another communication terminal has set the one channel as a forwarding channel, whether the second capacity that can be used in the one channel by the another communication terminal satisfies the required bandwidth.

6. The channel selection method according to claim 5, further comprising:
by the communication terminal, determining whether a capacity of at least one channel among the plurality of channels, which is allocated to another communication terminal that has not set a forwarding channel yet, satisfies the required bandwidth.

7. The channel selection method according to claim 5, further comprising:
by the communication terminal, referring to a channel status table that stores a channel allocated to a wireless communicator of another communication terminal and an identifier indicating whether the another communication terminal has already set the channel as a forwarding channel.

8. The channel selection method according to claim 5, wherein
the another communication terminal is a second communication terminal that is affected by channel interference when one of the plurality of channels is used.

9. A non-transient computer-readable recording medium, storing a program that causes a computer of a communication terminal including a wireless communicator to execute:
calculating, based on a maximum capacity that is predetermined for the one channel and a number of other communication terminals that have set the one channel as a forwarding channel, a first capacity that can be used in one of a plurality of channels by the communication terminal and a second capacity that can be used in the one channel by another communication terminal; and
determining, when the one channel is set as a forwarding channel, whether the first capacity that can be used in the one channel by the communication terminal satisfies a required bandwidth, and determining, when another communication terminal has set the one channel as a forwarding channel, whether the second capacity that can be used in the one channel by the another communication terminal satisfies the required bandwidth.

10. The non-transient computer-readable recording medium according to claim 9, wherein
    the program further causes the computer to execute:
    determining whether a capacity of at least one channel among the plurality of channels, which is allocated to another communication terminal that has not set a forwarding channel yet, satisfies the required bandwidth.

11. The non-transient computer-readable recording medium according to claim 9, wherein
    the program further causes the computer to execute:
    referring to a channel status table that stores a channel allocated to a wireless communicator of another communication terminal and an identifier indicating whether the another communication terminal has already set the channel as a forwarding channel.

* * * * *